(12) United States Patent
Yamaguchi (10) Patent No.: US 8,032,679 B2
(45) Date of Patent: Oct. 4, 2011

(54) DEVICE AND METHOD FOR CONTROLLING NETWORK PROCESSING MODE, AND NON-TRANSITORY COMPUTER-READABLE MEDIUM RECORDING PROGRAM FOR CONTROLLING NETWORK PROCESSING MODE

(75) Inventor: Hirobumi Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/662,776

(22) Filed: May 3, 2010

(65) Prior Publication Data

US 2010/0223411 A1    Sep. 2, 2010

Related U.S. Application Data (63) Continuation of application No. PCT/JP2007/071779, filed on Nov. 9, 2007.

(51) Int. Cl.
    *G06F 13/24*      (2006.01)
(52) U.S. Cl. ....................................................... 710/261
(58) Field of Classification Search ........... 710/260–269
See application file for complete search history.

(56) References Cited

U.S. PATENT DOCUMENTS

| | | | |
|---|---|---|---|
| 6,256,699 B1* | 7/2001 | Lee | 710/310 |
| 6,301,630 B1* | 10/2001 | Chen et al. | 710/310 |
| 6,651,131 B1* | 11/2003 | Chong et al. | 710/317 |
| 7,363,409 B2* | 4/2008 | Ren et al. | 710/260 |
| 7,610,425 B2* | 10/2009 | Solomita et al. | 710/260 |
| 7,721,033 B2* | 5/2010 | Duckman et al. | 710/260 |
| 7,743,195 B2* | 6/2010 | Bney-Moshe | 710/263 |

FOREIGN PATENT DOCUMENTS

| | | |
|---|---|---|
| JP | 7-49822 | 2/1995 |
| JP | 10-171668 | 6/1998 |
| JP | 2000-137692 | 5/2000 |
| JP | 2001-216170 | 8/2001 |
| JP | 2003-157177 | 5/2003 |
| JP | 2007-065978 | 3/2007 |

OTHER PUBLICATIONS

International Preliminary Report on Patentability mailed Jul. 8, 2010 in corresponding International Patent Application PCT/JP2007/071779.

(Continued)

*Primary Examiner* — Raymond Phan
(74) *Attorney, Agent, or Firm* — Staas & Halsey LLP (57) ABSTRACT

A network control device including a network controller for transmitting/receiving data through a network and storing received data in a storage and a network processor for processing data stored in the storage is provided with a usage information acquiring section for acquiring usage information indicating usage state of a CPU, a determining section for determining load state of the CPU from the usage information based on a determination condition, and a mode setting section for setting an interrupt mode to the network processor when the determined load state is low and setting a polling mode when the determined load state is high, the network processor processes data stored in the storage when receiving interrupt notification of the network controller during the interrupt mode, deters the interrupt notification of the network controller during the polling mode and processing data stored in the storage at predetermined intervals.

7 Claims, 7 Drawing Sheets

OTHER PUBLICATIONS

Toru Akamatsu, "Kernel Source Dokkaijutsu", Nikkei Linux, 2005, (Aug. 1, 2005), vol. 7, No. 1, 11 pages.
Japanese Office Action dated Dec. 21, 2010 in corresponding Japanese Patent Application No. 2009-539914.
Japanese Office Action dated Aug. 24, 2010 in corresponding Japanese Patent Application No. 2009-539914.
T. Kishi, "Function of Kernel and new features of Linux Kernel 2.6", Interface, CQ Publishing, Japan. Jul. 2005, p. 52-63.
H. Sato, "Focused points of changes in FreeBSD 4.11-release", UNIX User, Softbank Publishing, Japan. Apr. 2005, p. 54-59.
International Search Report for PCT/JP2007/071779, mailed Dec. 11, 2007.

* cited by examiner

| CONDITION NUMBER | MODE | LOAD STATE | DETERMINING METHOD |
|---|---|---|---|
| CONDITION 1 | INTERRUPT | HIGH | WHEN SYSTEM TIME VALUE IS EQUAL TO OR MORE THAN A CERTAIN THRESHOLD, AND WHEN IDLE TIME VALUE IS "0" |
| CONDITION 2 | | LOW | OTHER THAN DETERMINATION CONDITION OF "HIGH" OF CONDITION 1 |
| CONDITION 3 | | LOWER | WHEN SYSTEM TIME VALUE UNDERRUNS LOWER LIMIT OF A CERTAIN RANGE, AND WHEN IDLE TIME VALUE IS "0" |
| CONDITION 4 | | HIGHER (1) | WHEN SYSTEM TIME VALUE EXCEEDS UPPER LIMIT OF A CERTAIN THRESHOLD RANGE, AND WHEN IDLE TIME VALUE IS "0" |
| CONDITION 5 | POLLING | HIGHER (2) | WHEN IDLE TIME VALUE IS "0", AND WHEN INCREASE OF WAITED EXECUTIONS EXCEEDS A CERTAIN THRESHOLD |
| CONDITION 6 | | NONE | WHEN IDLE TIME VALUE BECOMES NOT "0" |
| CONDITION 7 | | UNCHANGEABLE | WHEN SYSTEM TIME VALUE IS WITHIN A CERTAIN RANGE, AND WHEN IDLE TIME VALUE IS "0" |

DEVICE AND METHOD FOR CONTROLLING NETWORK PROCESSING MODE, AND NON-TRANSITORY COMPUTER-READABLE MEDIUM RECORDING PROGRAM FOR CONTROLLING NETWORK PROCESSING MODE

CROSS-REFERENCE TO RELATED APPLICATIONS

This is an continuation application which claims the benefit of PCT international application number PCT/JP2007/071779, filed on Nov. 9, 2007.

FIELD

The embodiments discussed herein are related to a network processing control device, a program, and a method.

BACKGROUND

When receiving data (packet) from a network, a network control section (network controller) of a computer connecting to the network directly stores the received packet in a data storage section (ring buffer), and notifies a CPU of an interrupt.

When receiving the interrupt notification of the network controller, the CPU executes an interrupt handler of a network driver registered in an operating system (OS). The interrupt handler of the driver checks the ring buffer, and processes the packet stored in the ring buffer.

A method for processing the packet of the ring buffer by the network driver includes the following two types.

1. A method for processing the ring buffer only by the interrupt (interrupt method)

In the interrupt method, the network driver checks the ring buffer for every interrupt notification of the network controller, and processes the stored packet.

2. A method for processing the ring buffer by polling (polling method)

In the polling method, the network driver periodically checks the ring buffer, and when the ring buffer includes the packet, the network driver processes the included packet.

For example, the network driver suppresses an interrupt notifying function of the network controller for the first interrupt notification, after that, the network driver periodically checks the ring buffer, and processes the included packet. When the ring buffer is periodically checked, and when the packet is not included, the interrupt notifying function of the network controller is caused to be available, and the periodical checking is stopped.

As an opportunity for the periodical checking for the ring buffer, the following one or a plurality of timings are used.

(1) timer: the ring buffer is checked every certain time based on time monitoring by a timer.

(2) interrupt of another driver: the ring buffer is checked after it is completed to process the interrupt of another driver.

(3) a low priority daemon program: when a priority is set to a program, a low priority daemon program is provided, and the ring buffer is checked when the CPU is assigned to the daemon program.

Patent Document 1: Japanese Laid-Open Patent Publication No. 07-49822

The conventional data processing for the ring buffer includes the following problems.

(1) In the above interrupt method, when the network controller continuously receives a lot of the packets, that is, the network is highly loaded, the interrupt notification of the network controller frequently occurs, and the CPU is occupied by network processing of the network driver. As a result, another application program becomes unable to operate, and an original service of the system becomes unable to be provided.

(2) In the conventional polling method, because the data processing is executed by the polling, even when the network is highly loaded, such a state is not induced that the interrupt of the network driver frequently occurs. However, when the number of the packets received in a polling interval exceeds the number of the packets which can be stored in the ring buffer, the exceeding packets are discarded.

The following problems are induced because of methods for specifying the polling opportunity.

(2-1) When the polling opportunity is specified by the timer, latency (delay time) until the network driver processes the packet received by the network controller needs up to a timer interval time. Thus, processing timing of the network driver can not be advanced, so that performance of the original service of the system is degraded.

When the timer interval time is shortened, in the case of the network high load, such a state is induced that the network driver occupies the CPU, the application program becomes unable to operate, and the original service of the system is not provided.

(2-2) When the polling opportunity is specified by the interrupt of another driver, the interrupt of another driver is issued in an irregular interval, so that the latency until the network driver processes the packet received by the network controller can not be forecasted. Thus, in some state that the interrupt of another driver occurs, the performance of the original service of the system may be degraded.

Further, when the interrupts of another driver are many, another driver and the network driver occupy the CPU, the application program becomes unable to operate, and the original service of the system becomes unable to be provided.

(2-3) When the polling opportunity is specified by the low priority daemon program, because another application programs mostly continue to use the CPU, such a state is induced that the CPU is not assigned to the low priority daemon program. Thus, the daemon program is not initiated, and the packet received by the network driver can not be processed, so that the original service of the system becomes unable to be provided.

As described above, when such a state that a lot of the application program drivers use the CPU, and such a state that the network is highly loaded, and the network driver uses the CPU occur at the same time, in the conventional method, any processing for the application program and the network driver is sacrificed. Thus, such a problem is included that the original service of the system becomes can not be provided on the whole system.

SUMMARY

In the embodiments, in a network processing control device provided with a network control section for transmitting/receiving data through the network, and storing the received data in the data storage section, and a network processing section for processing the data stored in the data storage section, each processing means included in the network processing control device processes the following process.

When a CPU usage information acquiring section acquires CPU usage information indicating a usage state of the CPU of the network processing control device, a load state determining section, which is provided with a determination condition for determining whether the usage state of the CPU is a high load or a low load, determines a load state of the CPU from the CPU usage information.

When it is determined that the load state is a low load, a processing mode setting section sets an interrupt mode as a processing mode of the network processing section. When it is determined that the load state is a high load, the processing mode setting section sets a polling mode.

When the interrupt mode is set, at the opportunity of the interrupt notification issued when the network control section stores data in the data storage section, the network processing section processes the data. When the polling mode is set, the polling is executed for the data storage section in a predetermined interval, and the network processing section processes the data.

Meanwhile, when the polling mode is set, the interrupt notifying function of the network control section is suppressed, and when the mode is changed to the interrupt mode, the suppressed interrupt notifying function The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will be explained with reference to accompanying drawings.

Figure 1:
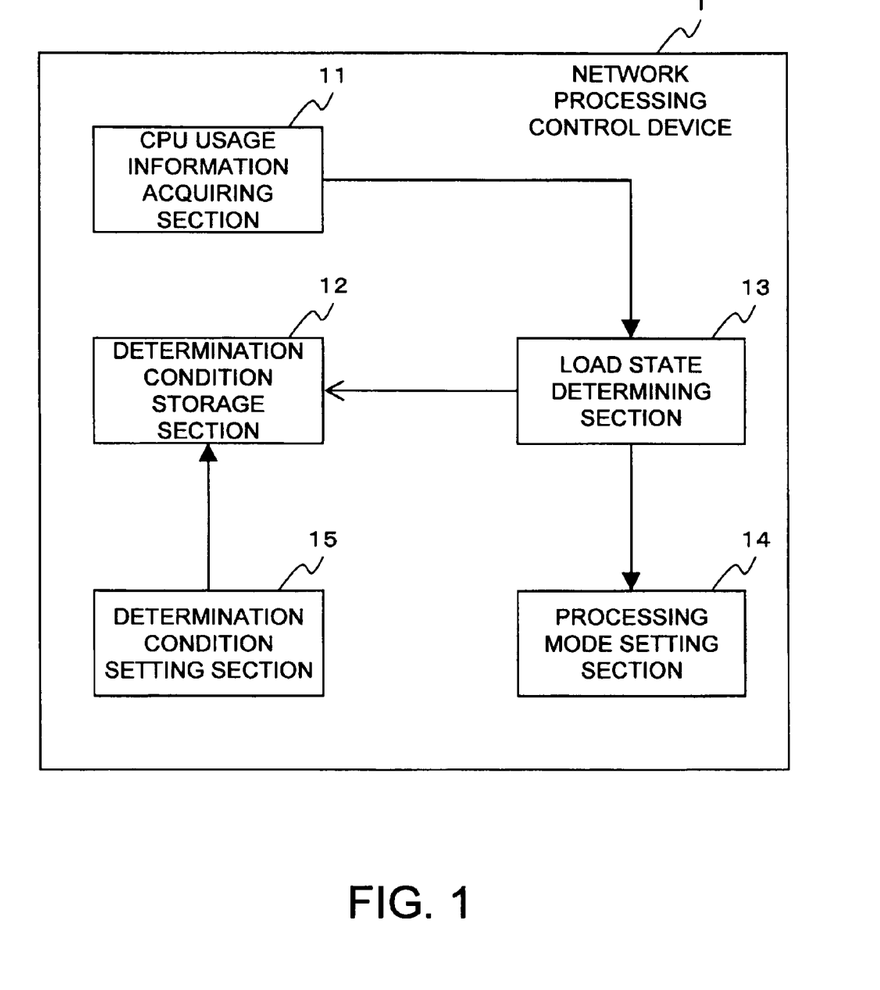
FIG. 1 is a diagram illustrating an exemplary configuration according to an embodiment of the present invention.
Figure 2:
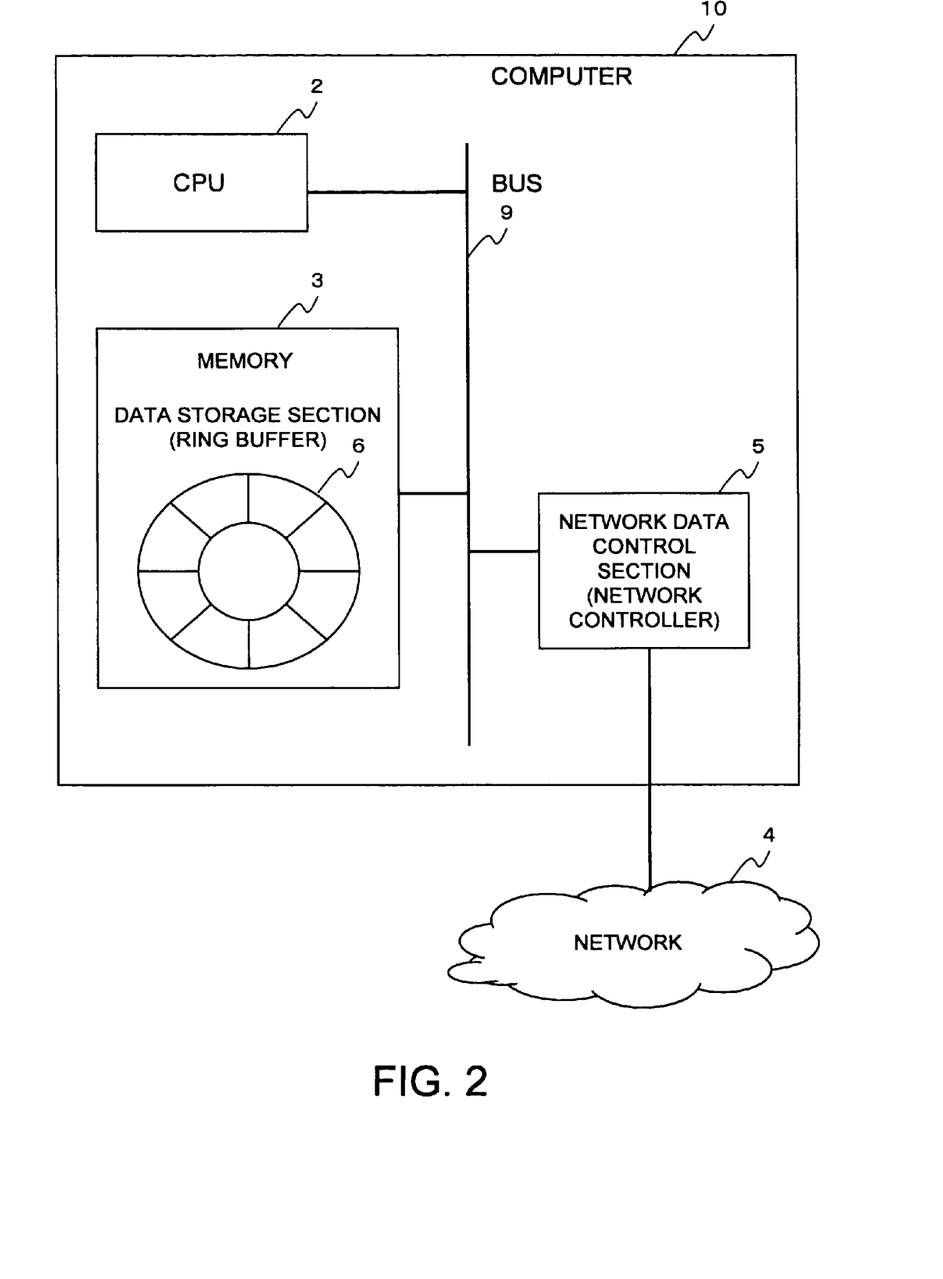
FIG. 2 is a diagram illustrating an exemplary configuration of a computer according to the embodiment of the present invention.
Figure 3:
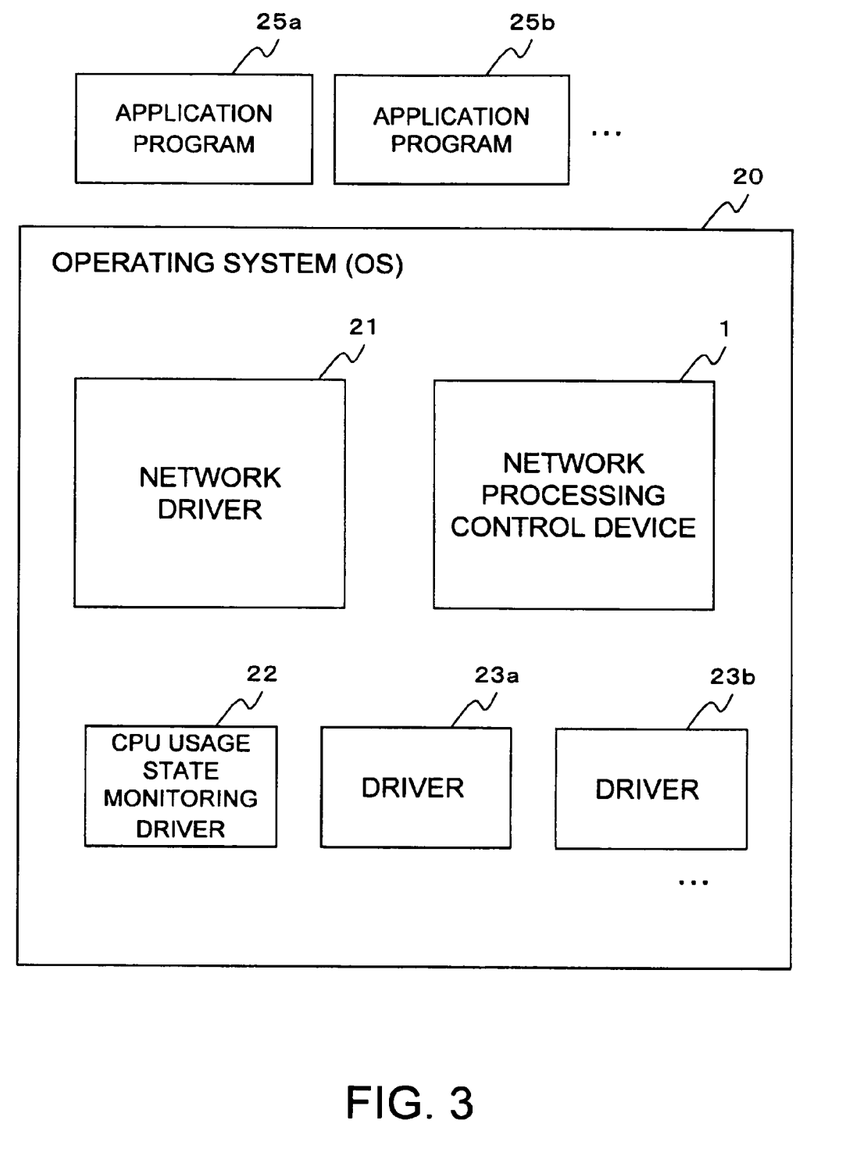
FIG. 3 is a diagram illustrating an exemplary configuration of software of the computer.

FIG. 1 is a diagram illustrating an exemplary configuration according to an embodiment of the present invention, FIG. 2 is a diagram illustrating an exemplary configuration of a computer 10 implementing the present embodiment, and FIG. 3 is a diagram illustrating an exemplary configuration of software of the computer 10.

A network processing control device 1 illustrated in FIG. 1 includes a CPU usage information acquiring section 11 configured with a software program, and the like, a determination condition storage section 12, a load state determining section 13, a processing mode setting section 14, and a determination condition setting section 15 in the computer 10.

As illustrated in FIG. 2, the computer 10 is configured so that each of a CPU 2, a memory 3, and a network data control section (network controller) 5 connected to a network 4 is connected by a bus 9.

The network controller 5 executes data transmitting/receiving processing through the network 4. The network controller 5 stores a packet received from the network 4 in an entry of a ring buffer 6.

The ring buffer 6 is provided in the memory 3 by a network driver 21, which is software for controlling the network controller 5.

As illustrated in FIG. 3, the computer 10 is provided with an operating system (OS) 20, and a network driver 21, a CPU usage state monitoring driver 22, other drivers 23a, 23b, . . . which are included in the operating system 20, and application programs 25a, 25b, . . . and the like.

The operating system 20 executes basic resource management of the system such as the assigning of the CPU 2 to the application programs 25a, 25b, . . . , the drivers 21, 22, 23a, 23b, . . . , and the like.

The network driver 21 controls the network controller 5 to communicate the packet between the operating system 20 and the network controller 5.

The network driver 21 can operate in two processing modes of "interrupt mode" and "polling mode". The "interrupt mode" is the processing mode in which an interrupt notifying function of the network controller 5 is caused to be available, and the network driver 21 executes packet processing because of an interrupt notice issued every time a received packet is stored in the ring buffer 6. The "polling mode" is the processing mode in which the interrupt notifying function of the network controller 5 is suppressed, the network driver 21 polls the ring buffer 6 in a predetermined interval, and when the received packet is included in the ring buffer 6, the packet processing of the received packet is executed.

The CPU usage state monitoring driver 22 monitors a usage state of the CPU 2 to collect a variety of pieces of measurement information indicating the usage state of the CPU 2.

The application program 25 is a program for providing a service as the system of the computer 10.

The CPU usage information acquiring section 11 of the network processing control device 1 acquires CPU usage information of the CPU 2 from the CPU usage state monitoring driver 22.

Specifically, the following statistical values are monitored and managed by the CPU usage state monitoring driver 22, and are acquired by the CPU usage information acquiring section 11.

(1) user time: a recent usage rate of the CPU 2 of the application program 25 per unit time, (2) system time: a recent usage rate of the CPU 2 of the programs (the operating system 20, the drivers 21, 22, 23, and the like) other than the application program 25 per unit time, (3) idle time: a recent idle rate of the CPU 2 per unit time, and (4) the number of waited executions: a recent average value of the number of the application programs, whose executions are waited, per unit time.

The determination condition storage section 12 stores a determination condition, which is used by the load state determining section 13, for determining whether the usage state of the CPU 2 is a high load or a low load.

Figure 4:
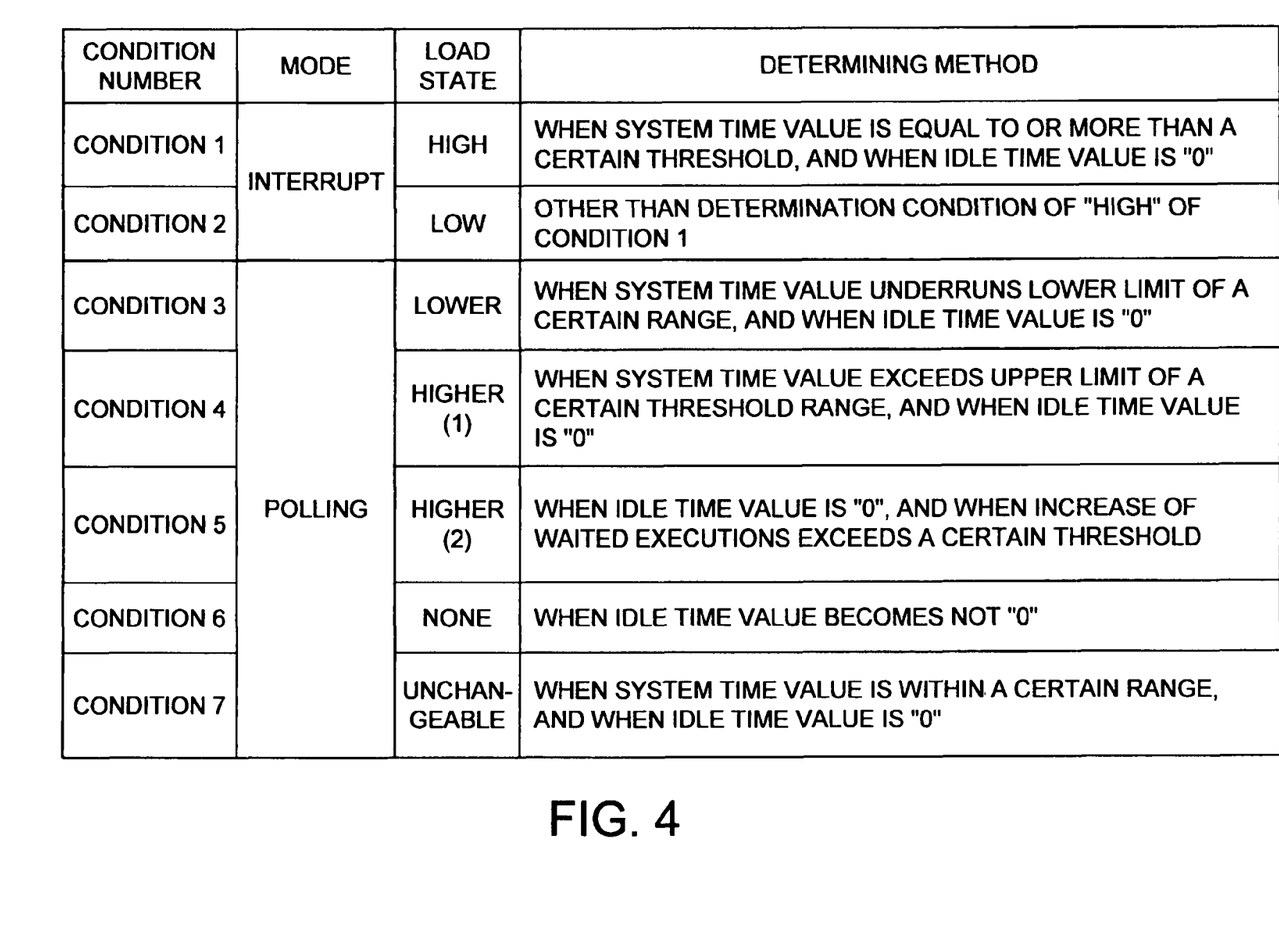
FIG. 4 is a diagram illustrating an example of a determination condition.

FIG. 4 is a diagram illustrating an example of determination condition.

Conditions 1 and 2 of FIG. 4 are determination conditions used when the "interrupt mode" is set as the processing mode of the network driver 21, and conditions 3 to 7 are determination conditions used when the "polling mode" is set as the processing mode.

Condition 1: when the "interrupt mode" is set, and when the measurement value acquired from the CPU usage state monitoring driver 22 satisfies "when a system time value is equal to or more than a certain threshold, and when an idle time value is "0"", it is determined that the load of the CPU 2 is "high". When the condition 1 is satisfied, the processing mode transits from the "interrupt mode" to the "polling mode".

Condition 2: when the "interrupt mode" is set, and when the measurement value acquired from the CPU usage state monitoring driver 22 does not satisfy the "condition 1", it is determined that the load of the CPU 2 is "low". In this case, the "interrupt mode" is maintained.

Condition 3: when the "polling mode" is set, and when the measurement value acquired from the CPU usage state monitoring driver 22 satisfies "when the system time value underruns a lower limit of a certain range, and when the idle time value is "0"", it is determined that the load of the CPU 2 is "lower". In this case, an interval of the polling is changed to be shorter.

Condition 4: when the "polling mode" is set, and when the measurement value acquired from the CPU usage state monitoring driver 22 satisfies "when the system time value exceeds a higher limit of a certain threshold range, and when the idle time value is "0"", it is determined that the load of the CPU 2 is "higher". In this case, an interval of the polling is changed to be longer.

Condition 5: when the "polling mode" is set, and when the measurement value acquired from the CPU usage state monitoring driver 22 satisfies "when the idle time value is "0", and when an increment of the waited executions exceeds a certain threshold range", it is determined that the load of the CPU 2 is "higher". In this case, an interval of the polling is changed to be longer.

Condition 6: when the "polling mode" is set, and when the measurement value acquired from the CPU usage state monitoring driver 22 satisfies "the idle time value becomes not "0"", it is determined that the load of the CPU 2 is "none". In this case, the processing mode transits from the "polling mode" to the "interrupt mode".

Condition 7: when the "polling mode" is set, and when the measurement value acquired from the CPU usage state monitoring driver 22 satisfies "when the system time value is within a certain range, and when the idle time value is "0"", it is determined that the load of the CPU 2 is "not-changed". In this case, the "polling mode" is maintained, and the interval of the polling is not changed.

The load state determining section 13 refers to the determination condition of the determination condition storage section 12, and determines a load state of the CPU 2 by using the measurement value, which is acquired from the CPU usage state monitoring driver 22, of the CPU 2.

When the measurement value of the CPU 2 exceeds the predetermined upper limit, the load state determining section 13 determines based on the determination condition that the load of the CPU 2 is "higher". When the measurement value of the CPU 2 underruns the predetermined lower limit, the load state determining section 13 determines that the load of CPU 2 is "lower".

The processing mode setting section 14 sets the processing mode of the network driver 21 based on the load state of the CPU 2, which is determined by the load state determining section 13. Based on the determination condition, the processing mode setting section 14 sets the "interrupt mode" when it is determined that the load state of the CPU 2 is "low", and the processing mode setting section 14 sets the "polling mode" when it is determined that the load state of the CPU 2 is "high".

Thus, when the load state of the CPU 2 is low, the network driver 21 operates in the "interrupt mode". In the "interrupt mode", when the network controller 5 receives the packet, and stores the received packet in the ring buffer 6, the interrupt notice of the network controller 5 is immediately issued, so that latency from when the packet is received to when the received packet is processed by the network driver 21 can be minimized.

When the load of the CPU 2 is high, the network driver 21 operates in the "polling mode". In the "polling mode", the interrupt notice of the network controller 5 is not issued, and the network driver 21 processes the received packet in the ring buffer 6 in a variable time interval. Thus, the interval of the polling needs to be more than a certain value, so that the application program 25, other driver 23, and the like become able to operate.

When it is determined that the load of the CPU 2 is "higher", the processing mode setting section 14 changes the interval of the polling of the polling mode to the interval which is longer than the currently-set interval. When it is determined that the load of the CPU 2 is "lower", the processing mode setting section 14 changes the interval of the polling to the interval which is shorter than the currently-set interval.

As described above, in the polling mode, the interval of the polling is varied based on the degree of the load of the CPU 2, thereby, the minimum necessary interval can be maintained corresponding to the load of the CPU 2.

The determination condition setting section 15 is an interface in which the application program 25 can change the threshold used for the determination condition, and the like. A user of the computer 10 can set the arbitrary threshold to the determination condition stored in the determination condition storage section 12.

Figure 5:
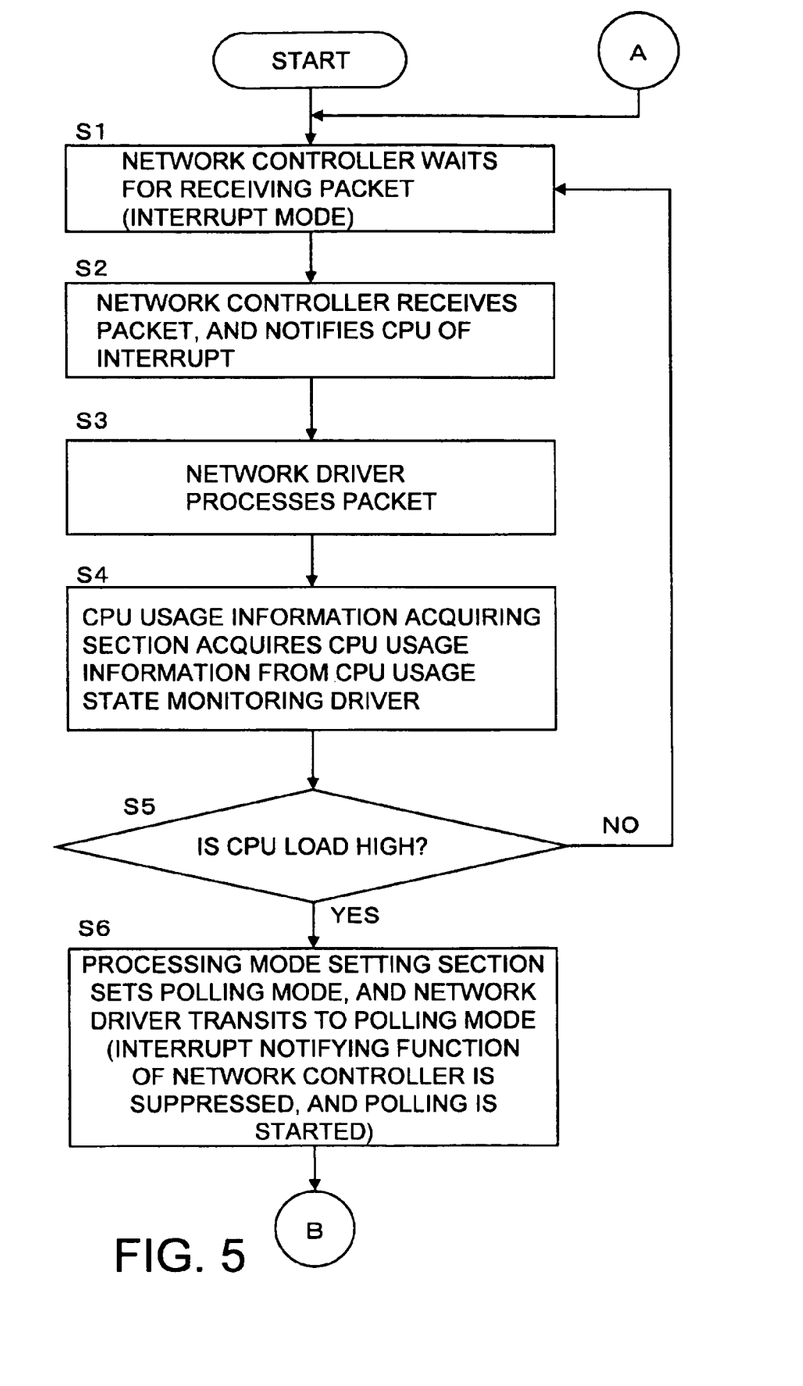
FIG. 5 is a flowchart illustrating a flow of processing (processing in the case of an interrupt mode) according to the embodiment of the present invention.
Figure 6:
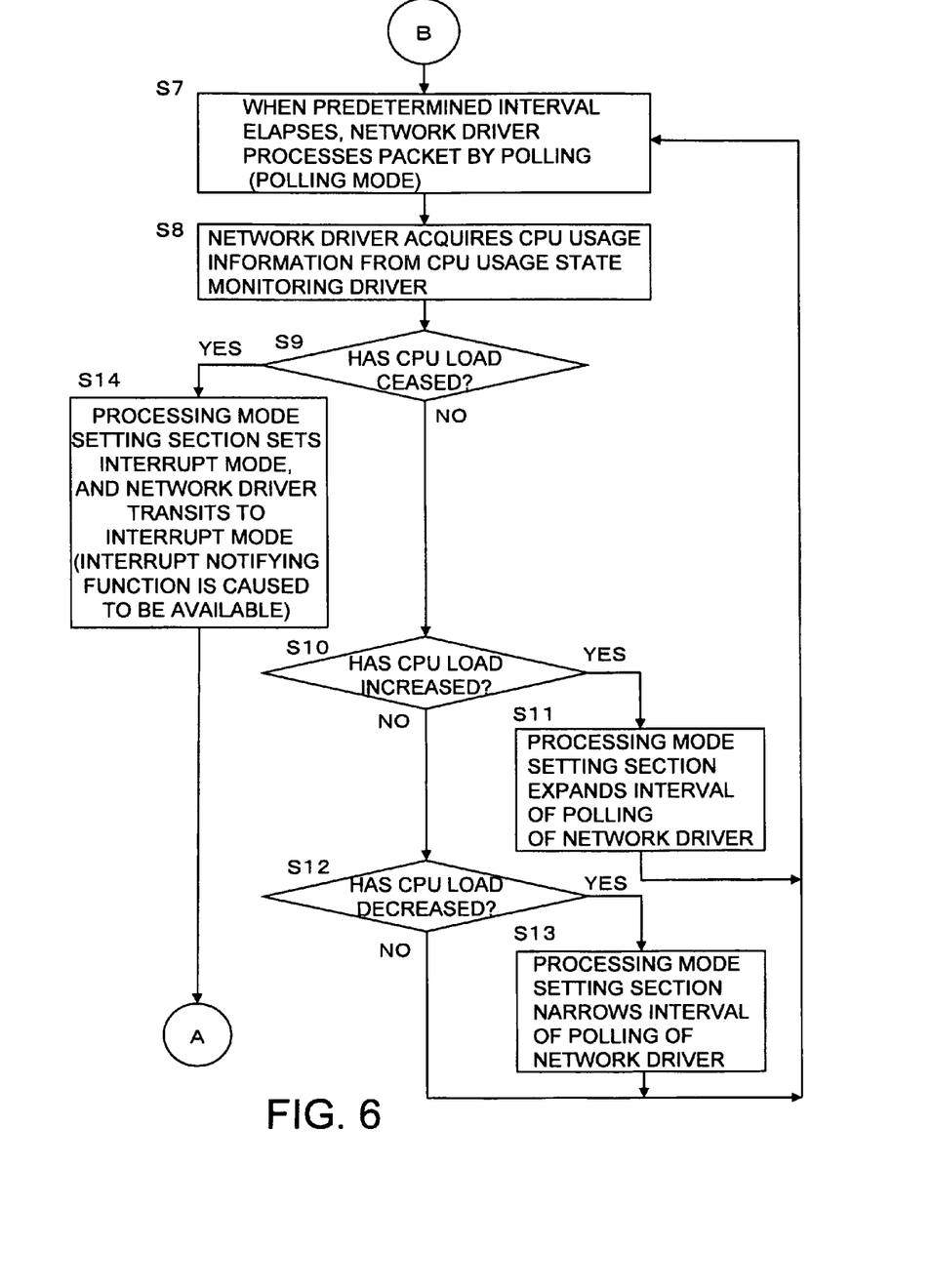
FIG. 6 is a flowchart illustrating a flow of processing (processing in the case of a polling mode) according to the embodiment of the present invention.

FIGS. 5 and 6 are flowcharts illustrating flows of the processing according to the present embodiment.

Step S1: The network controller 5 waits for receiving the packet.

Step S2: When receiving the packet from the network 4, the network controller 5 stores the received packet in the ring buffer 6, and issues the interrupt notice to the CPU 2.

Step S3: The network driver 21 processes the packet in the ring buffer 6.

Step S4: The CPU usage information acquiring section 11 of the network processing control device 1 acquires the CPU usage information (the system time value, the idle time value, the number of waited executions of the application) from the CPU usage state monitoring driver 22 in the packet processing of the network driver 21 in the interrupt mode.

Step S5: The load state determining section 13 determines the load of the CPU 2. When the measurement value of the CPU 2 corresponds to the condition 1, it is determined that the load is high, and the processing proceeds to step S6. On the other hand, when the measurement value of the CPU 2 does not correspond to the condition 1, it is determined that the load of the CPU 2 is low, and the processing returns to step S1.

Step S6: The processing mode setting section 14 sets the polling mode. The network driver 21 transits to the polling mode, suppresses the interrupt notifying function of the network controller 5, and starts the polling in a predetermined interval. Meanwhile, in the processing of step S5, when it is determined that the load of the CPU 2 is low, the network driver 21 still operates in the interrupt mode.

Step S7: The network driver 21 processes the packet in the ring buffer 6 by polling in a certain time interval.

Step S8: After the packet processing, the CPU usage information acquiring section 11 acquires the CPU usage information (the system time value, the idle time value, the number of waited executions of the application) from the CPU usage state monitoring driver 22.

Step S9: The load state determining section 13 determines the load state of the CPU 2 based on the CPU usage information (the measurement value of the CPU 2). When the measurement value of the CPU 2 corresponds to the condition 6, it is determined that the load of the CPU 2 is "none", and the processing proceeds to step S14. When the measurement value of the CPU 2 does not correspond to the condition 6, it is determined that the load of the CPU 2 "exists", and the processing proceeds to step S10.

Step S10: When the measurement value of the CPU 2 corresponds to any of the condition 4 and the condition 5, the load state determining section 13 determines that the load of the CPU 2 is "higher", and the processing proceeds to step S11. When the measurement value of the CPU 2 does not correspond to any of the condition 4 and the condition 5, the processing proceeds to step S12.

Step S11: The processing mode setting section 14 changes the interval of the polling to the interval which is longer than the current interval by a predetermined interval. The network driver 21 polls in the changed interval.

Step S12: When the measurement value of the CPU 2 corresponds to the condition 3, the load state determining section 13 determines that the load of the CPU 2 is "lower", and the processing proceeds to step S13. When the measurement value of the CPU 2 does not correspond to the condition 3, the processing returns to step S7.

Step S13: The processing mode setting section 14 changes the interval of the polling to the interval which is shorter than the current interval by a predetermined interval. The network driver 21 polls in the changed interval.

Step S14: The processing mode setting section 14 sets the interrupt mode. The network driver 21 transits to the interrupt mode, and causes the interrupt notifying function of the network controller 5 to be available. After that, the processing returns to step S1.

Figure 7:
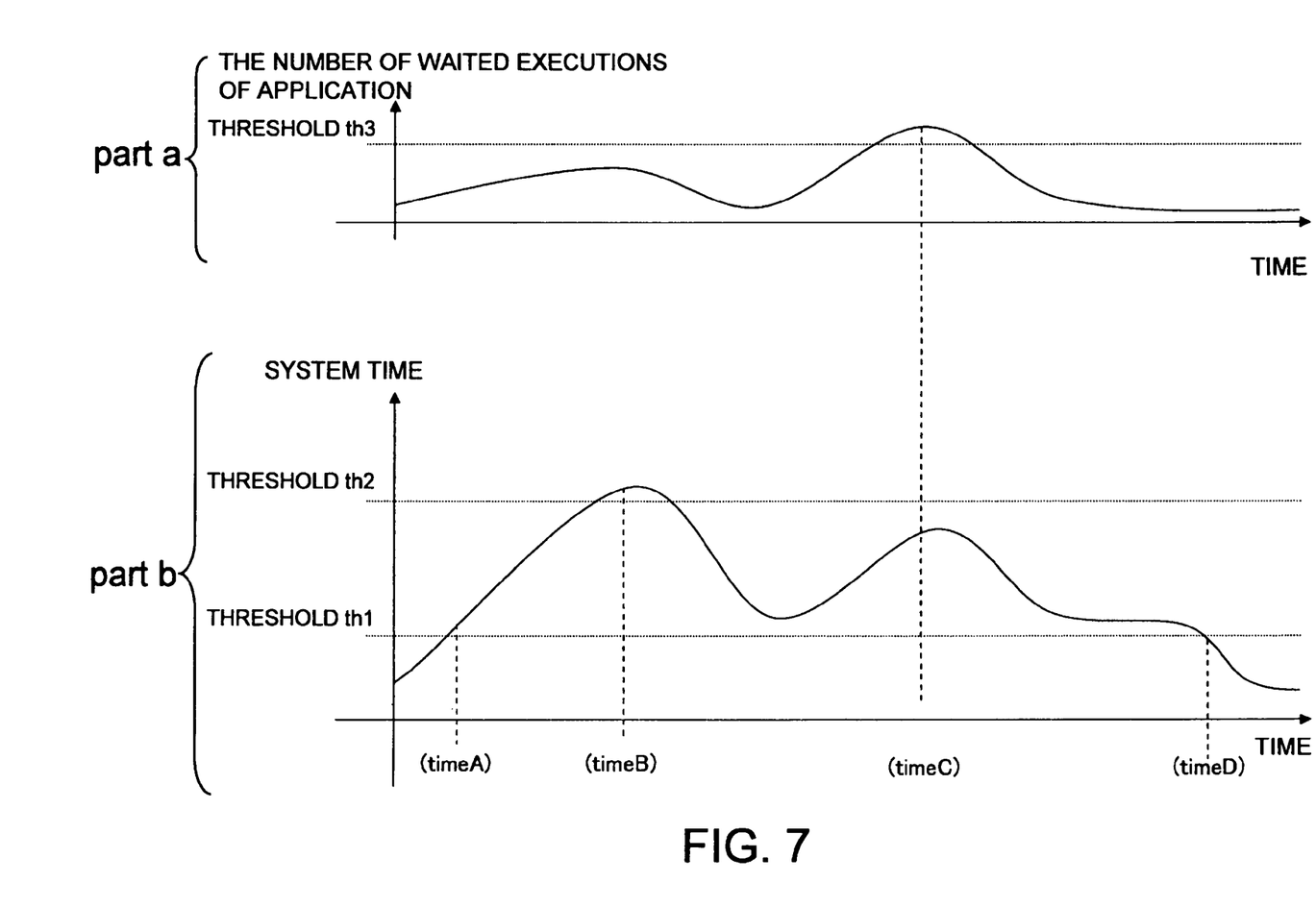
FIG. 7 is a diagram describing transition of CPU usage information and change timing of a processing mode.

FIG. 7 is a diagram describing transition of the CPU usage information and change timing of the processing mode.

"Part a" illustrated in FIG. 7 is a diagram illustrating a time-series graph of the number of the waited executions of the application, and changing timing of the processing mode, the threshold of the determination condition, and the interval of the polling of the CPU usage information, and "part b" illustrated in FIG. 7 is a diagram illustrating a time-series graph of the system time value, and changing timing of the processing mode, the threshold of the determination condition, and the interval of the polling of the CPU usage information.

In FIG. 7, thresholds th1 to th3 will be described below.

threshold th1: the threshold of the system time value for transiting to the polling mode in the interrupt mode, or the threshold for narrowing the interval of the polling in the polling mode, threshold th2: the threshold of the system time value for lengthening the interval of the polling, and threshold th3: the threshold of the number of the waited executions for lengthening the interval of the polling.

Timing time A to time D will be described below. Here, it is assumed that the idle time of the CPU usage information is constantly "0". The network driver 21 is operating in the interrupt mode as an initial setting.

At the time A, the system time exceeds the threshold th1. At that time, it is determined that the load of the CPU 2 is "high", and the interrupt mode is changed to the polling mode. The network driver 21 transits to the polling mode. Here, it is assumed that the interval of the polling is an interval interval_1, which is an initial setting.

Between the time A and the time B, the interval interval_1 is too short as the interval of the polling, so that the system time value continues to increase.

At the time B, the system time value exceeds the threshold th2. Here, it is determined that the load of the CPU 2 is "higher", and the interval of the polling is changed to an interval interval_2, which is longer by one step.

Between the time B and the time C, the interval of the polling becomes longer, so that the system time value starts decreasing. However, because of the increase of an application load, the system time value starts increasing again.

At the time C, while the system time value does not reach the threshold th2, the number of the waited executions exceeds the threshold th3. Thus, the interval of the polling is changed to an interval interval_3, which is further longer by one step.

Between the time C and the time D, the interval of the polling becomes longer, so that the system time value starts decreasing.

Next, at the time D, the system time value underruns the threshold th1. However, the idle time value is "0", so that the interval of the polling is returned to the interval interval_2, which is shorter by one step.

Meanwhile, at this time, when the idle time value is not "0", the polling mode is returned to the interrupt mode. When the "polling mode" is set, the interval interval_1, which is the initial setting, is set as the interval of the polling.

Hereinbefore, the embodiment of the present invention has been described. However, it is apparent that a variety of modifications can be applied without departing from the concept of the present invention. For example, such an example has been described as the embodiment of the present invention that the network processing control device 1 is configured as the program cooperating with the network driver 21. However, the network processing control device 1 may be configured as one function section in the network driver 21.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the sprit and scope of the invention.

What is claimed is:

1. A network processing control device provided with a data storage section, a network control section for transmitting/receiving data through a network and storing received data in the data storage section, and a network processing section for processing data stored in the data storage section, the network processing control device comprising:
   a CPU usage information acquiring section for acquiring CPU usage information indicating a usage state of a CPU of the network processing control device;
   a load state determining section for determining a load state of the CPU from the CPU usage information, by using determination condition for determining the usage state of the CPU is a high load or a low load; and a processing mode setting section for setting a processing mode of the network processing section to an interrupt mode when the determined load state is a low load, and setting a processing mode of the network processing section to a polling mode when the determined load state is a high load, wherein, when the interrupt mode is set, the network processing section executes processing of data stored in the data storage section if an interrupt notice is issued by the network control section, and when the polling mode is set, the network processing section suppresses the interrupt notice of the network control section, and executes processing of data stored in the data storage section in a predetermined interval.

2. The network processing control device according to claim 1, wherein the CPU usage information acquiring section acquires a number of application programs using the CPU as the CPU usage information, and the load state determining section determines the load state of the CPU from the acquired number of the application programs, by using determination condition for determining the usage state of the CPU based on the acquired number of the application programs unit the CPU.

3. The network processing control device according to claim 1, wherein the load state determining section determines whether a measurement value of the CPU usage information is equal to or more than an upper limit value which is set as the determination condition in advance, and the processing mode setting section changes an interval of the polling to be longer when the measurement value is equal to or more than the upper limit value.

4. The network processing control device according to claim 1, wherein the load state determining section determines whether a measurement value of the CPU usage information is equal to or less than a lower limit value which is set as the determination condition in advance, and the processing mode setting section changes an interval of the polling to be shorter when the measurement value is equal to or less than the lower limit value.

5. The network processing control device according to claim 1, further comprising a determination condition setting section for accepting an input of information on setting or change of the determination condition, and updating the determination condition.

6. A network processing control method implemented by a computer provided with a network control section for transmitting/receiving data through a network and storing the received data in a data storage section, and a network processing section for processing the data stored in the data storage section, the network processing control method comprising:

acquiring CPU usage information indicating a usage state of a CPU of the computer;

determining load state of the CPU from the CPU usage information by using a determination condition for determining whether the usage state of the CPU is a high load or a low load;

setting a processing mode of the network processing section to an interrupt mode when the determined load state is a low load, and setting a processing mode of the network process section to a polling mode when the determined load state is a high load; and executing data processing of data stored in the data storage section using an interrupt notice issued by the network control section when the interrupt mode is set as the processing mode, and suppressing the interrupt notice of the network control section and executing data processing of data stored in the data storage section in a predetermined interval when the polling mode is set as the processing mode.

7. A computer readable medium storing a network processing control program causing a computer provided with a network control section for transmitting/receiving data through a network and storing the received data in a data storage section, and a network processing section for processing the data stored in the data storage section to execute:

CPU usage information acquiring processing for acquiring CPU usage information indicating a usage state of a CPU of the computer;

load state determining processing for including a determination condition for determining whether the usage state of the CPU is a high load or a low load, and determining the load state of the CPU from the CPU usage information;

processing mode setting processing for setting an interrupt mode when the load state is determined to be a low load and setting a polling mode when the load state is determined to be a high load as a processing mode of the network processing section; and network processing for executing data processing of the data storage section using an interrupt notice issued by the network control section as an opportunity when the interrupt mode is set, and suppressing the interrupt notice of the network control section, and executing data processing of the data storage section in a predetermined interval when the polling mode is set in the data processing of the network processing section.

* * * * *